(12) United States Patent
Corona

(10) Patent No.: US 8,819,694 B2
(45) Date of Patent: Aug. 26, 2014

(54) SYSTEM AND METHOD FOR EMBEDDED LOAD BALANCING IN A MULTIFUNCTION PERIPHERAL (MFP)

(75) Inventor: Fatima Corona, Long Beach, CA (US)

(73) Assignee: Samsung Electronics Co., Ltd., Suwon, Gyeonggi-Do (KR)

(*) Notice: Subject to any disclaimer, the term of this patent is extended or adjusted under 35 U.S.C. 154(b) by 1295 days.

(21) Appl. No.: 11/961,999

(22) Filed: Dec. 20, 2007

(65) Prior Publication Data
US 2009/0165012 A1 Jun. 25, 2009

(51) Int. Cl.
 G06F 9/46 (2006.01)
 G06F 15/173 (2006.01)
 G06F 3/12 (2006.01)

(52) U.S. Cl.
 USPC ........... 718/105; 718/104; 709/225; 709/226; 358/1.13; 358/1.15

(58) Field of Classification Search
 USPC .............. 718/1–105; 709/201–203, 217–229; 358/1.1–1.9, 1.11–1.19
 See application file for complete search history.

(56) References Cited

U.S. PATENT DOCUMENTS

| | | | |
|---|---|---|---|
| 5,860,066 A * | 1/1999 | Rouse | 705/301 |
| 6,498,656 B1 * | 12/2002 | Mastie et al. | 358/1.15 |
| 6,930,795 B1 * | 8/2005 | Motamed et al. | 358/1.18 |
| 2003/0007177 A1 * | 1/2003 | Ferlitsch | 358/1.15 |
| 2004/0190042 A1 * | 9/2004 | Ferlitsch et al. | 358/1.15 |
| 2005/0195419 A1 * | 9/2005 | Bart | 358/1.13 |
| 2005/0240925 A1 * | 10/2005 | Ault et al. | 718/100 |
| 2007/0121147 A1 * | 5/2007 | Corona et al. | 358/1.15 |
| 2007/0133485 A1 * | 6/2007 | Tredoux et al. | 370/338 |
| 2008/0204794 A1 * | 8/2008 | Watterson et al. | 358/1.15 |

\* cited by examiner

*Primary Examiner* — Abdullah Al Kawsar
(74) *Attorney, Agent, or Firm* — IP Investment Law Group

(57) ABSTRACT

The invention relates to multifunction peripherals (MFPs). More particularly, the invention relates to an embedded load balancer in a multifunction peripheral. An MFP with an embedded load balancer may determine that another suitable device is more capable of handling a job request, and, subsequently, may transfer the job request to the other device.

23 Claims, 6 Drawing Sheets

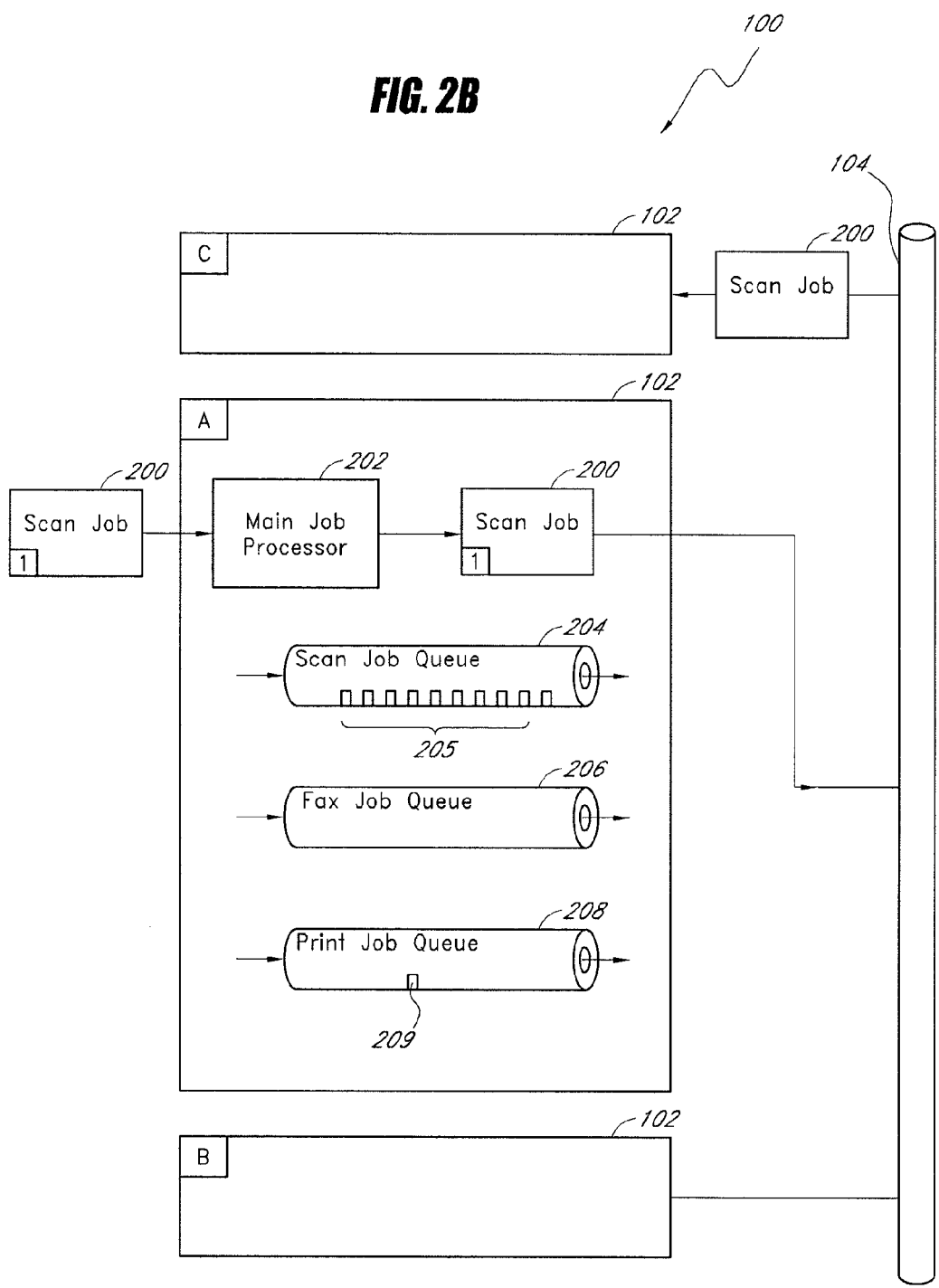

SYSTEM AND METHOD FOR EMBEDDED LOAD BALANCING IN A MULTIFUNCTION PERIPHERAL (MFP)

BACKGROUND OF THE INVENTION

1. Field of the Invention

The invention relates to multifunction peripherals (MFPs). More particularly, the invention relates to embedded load balancing in a multifunction peripheral.

2. Description of the Related Art

Certain devices among a group of networked devices, such as networked multifunction peripherals, may receive more jobs within a certain period of time than other similarly capable devices within the group. If the jobs are evenly distributed among similarly capable devices, the overall productivity of the system may be increased. Thus, there is a need to balance the load of networked devices, such as multifunction peripherals.

SUMMARY OF CERTAIN INVENTIVE ASPECTS

In general, aspects of the invention relate to multifunction peripherals. Specifically, embodiments of the invention relate to embedded load balancing in a multifunction peripheral.

One aspect is a method of load balancing jobs among multifunction peripheral (MFP) devices in a network, the method comprising: receiving a job at a first MFP device in the network; after receiving the job, determining, at the first MFP device, a capacity of the first MFP device to process the job; querying, from the first MFP device, a second MFP device; in response to being queried, determining, at the second MFP device, a capacity of the second MFP device to process the job; transmitting, from the second MFP device to the first MFP device, information associated with the capacity of the second MFP device to process the job; based on the transmitted information, determining, at the first MFP device, whether to transfer a portion of the job to the second MFP device in order to load balance the first MFP device and the second MFP device; and in response to a determination to transfer the portion of the job to the second MFP device, transferring, from the first MFP device to the second MFP device, the portion of the job and processing the portion of the job at the second MFP device.

A computer readable medium having instructions stored thereon for load balancing jobs among multifunction peripheral (MFP) devices in a network, the instructions comprising: receiving a job at a first MFP device in the network; after receiving the job, determining, at the first MFP device, a capacity of the first MFP device to process the job; querying, from the first MFP device, a second MFP device; in response to being queried, determining, at the second MFP device, a capacity of the second MFP device to process the job; transmitting, from the second MFP device to the first MFP device, information associated with the capacity of the second MFP device to process the job; based on the transmitted information, determining, at the first MFP device, whether to transfer a portion of the job to the second MFP device in order to load balance the first MFP device and the second MFP device; and in response to a determination to transfer the portion of the job to the second MFP device, transferring, from the first MFP device to the second MFP device, the portion of the job and processing the portion of the job at the second MFP device.

Another aspect is An MFP device with an embedded load balancer, the MFP device comprising: a network interface; a scanner, the MFP configured to transfer scanned images from the scanner to other MFP devices via the network interface; a load balancing module comprising instructions to balance a load of jobs utilizing the scanner by transferring jobs to other MFP devices via the network interface, the instructions comprising: receiving a job at the MFP; querying, via the network interface, at least one other MFP device for its capacity to process the job; receiving, from the at least one other MFP device, information associated with the at least one other MFP device's capacity to process the job; based on the transmitted information, determining whether to transfer a portion of the job to the at least one other MFP device in order to load balance the MFP device and the at least one other MFP device; and in response to a determination to transfer the portion of the job to the at least one other MFP device, transferring the portion of the job to the at least one other MFP device.

Yet another aspect is an MFP device with an embedded load balancer, the MFP device comprising: a network interface; a scanner, the MFP configured to transfer scanned images from the scanner to other MFP devices via the network interface; a load balancing module comprising instructions to balance a load of jobs utilizing the scanner by receiving jobs from other MFP devices via the network interface, the instructions comprising: receiving a query to determine a capacity of the MFP to process a job, the query originating from one of the other MFP devices via the network interface; determining the capacity of the MFP to process the job; transmitting information associated with the capacity of the MFP device to process the job; and if the MFP device receives the job from the one of the other MFP devices, processing the portion of the job.

BRIEF DESCRIPTION OF THE DRAWINGS

FIGS. 2A and 2B illustrate one embodiment of a multifunction peripheral with embedded load balancing.

DETAILED DESCRIPTION OF CERTAIN INVENTIVE EMBODIMENTS

Figure 1:
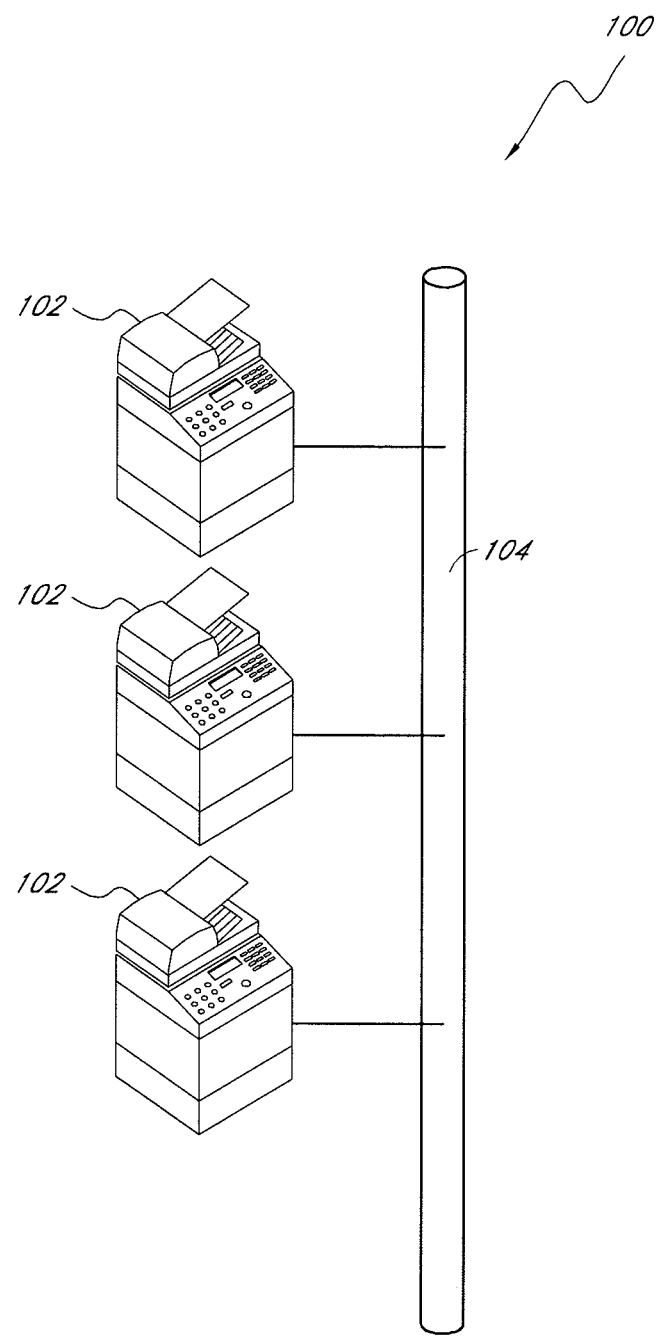
FIG. 1 illustrates a network of multifunction peripherals.

Various aspects and features of the invention will become more fully apparent from the following description and the pending claims taken in conjunction with the foregoing drawings. In the drawings, like reference numerals indicate identical or functionally similar elements. The drawings, associated descriptions, and specific implementations are provided to illustrate the embodiments of the invention, but not to limit the scope of the disclosure.

In general, the invention relates to methods, systems, and software for implementing embedded load balancing modules in a multi-function peripheral (MFP). Embodiments of the invention are directed to increase the output of networked devices, such as multifunction peripherals, by enabling several jobs to be processed at once. In some embodiments, an embedded load balancing module determines if a job should be rerouted to an available networked device in order to off-load some of the many jobs it is scheduled to process, thereby improving productivity. By embedding load-balancing software in the networked multifunction peripheral, the system reaps the advantages of automatic load-balancing from within the device, which may reduce the need for installing third-party load balancing applications and/or using a dedicated computer for the load balancing.

In general, an MFP device is a single integrated device configured to perform two or more functions, including, without limitation, scanning, copying, printing, faxing, combinations of the same, and the like. The functionality of an MFP device may be accessed over a network, including, for example, the Internet, or a LAN, or at the device itself. An MFP device may be configured with sufficient memory to queue jobs waiting to be processed. It will be appreciated that MFP devices may be configured to perform in a variety of different network and standalone computing environments. Although some of the embodiments described herein relate to an MFP device, other embodiments may be implemented with other peripheral devices, such as single-function devices, including for example printers and scanners.

It will be appreciated by one skilled in the art that many of an MFP's functions, including load-balancing functions, may be executed by one or more modules in various forms of computer-readable media. The word module refers to logic embodied in hardware or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Moreover, although in some embodiments a module may be separately compiled, in other embodiments a module may represent a subset of instructions of a separately compiled program, and may not have an interface available to other logical program units.

The embodiments described below are directed to MFPs with embedded load balancing modules. MFPs are capable of processing multiple jobs at the same time. MFPs may accomplish this by storing jobs in local memories and performing certain functions for jobs as device resources become available. For example, an MFP device may receive an image of a document through its physical scanner. Typically, a user may request that a scanned document be sent to a group of recipients via an email address. For example, a user may request that a scanned document be sent to everyone working on a particular project. In addition to email addresses, other destinations may include: a network folder, a File Transfer Protocol (FTP) address, a Hypertext Transfer Protocol (HTTP) address, a local device memory, and a fax number. If an MFP has reached a certain capacity, it may be advantageous to transfer the task of sending the scanned document to another MFP accessible via a network.

As another example, an MFP may receive a print request. The request may include a document image, which is to be printed by the MFP. This request may originate from, for example, one of the following: a fax machine, a local device memory, and another computing device in the network. If the MFP's printing device (including, possibly, its memory) has reached a certain capacity, the MFP may decide to transfer the task of printing to another MFP accessible via a network. The embodiments below describe different systems, methods, and software for transferring jobs, or portions of jobs, in order to balance loads (capacities) among multiple MFP devices.

FIG. 1 illustrates a networked MFP system 100. The networked MFP system 100 includes MFPs 102 connected via a network 104. In some embodiments, the MFPs are connected to the network 104 via Ethernet connections. It will be appreciated by one skilled in the art that other suitable network connections may be used. Although in the illustrated embodiment the networked MFPs 102 are the same type of device, those skilled in the art will appreciate that, in other embodiments, different network devices may be used. For example, an MFP with embedded load balancing may be connected via a network to a single-function printer, which receives the job off-loaded by the MFP. In other words, when the load on the MFP reaches a certain tolerance, the MFP may off-load some of its jobs to a networked single-function printer. Thus, the embodiments described below are not limited to systems where the networked devices are the same type of devices, such as MFPs 102 with embedded load balancing.

Figure 2A:
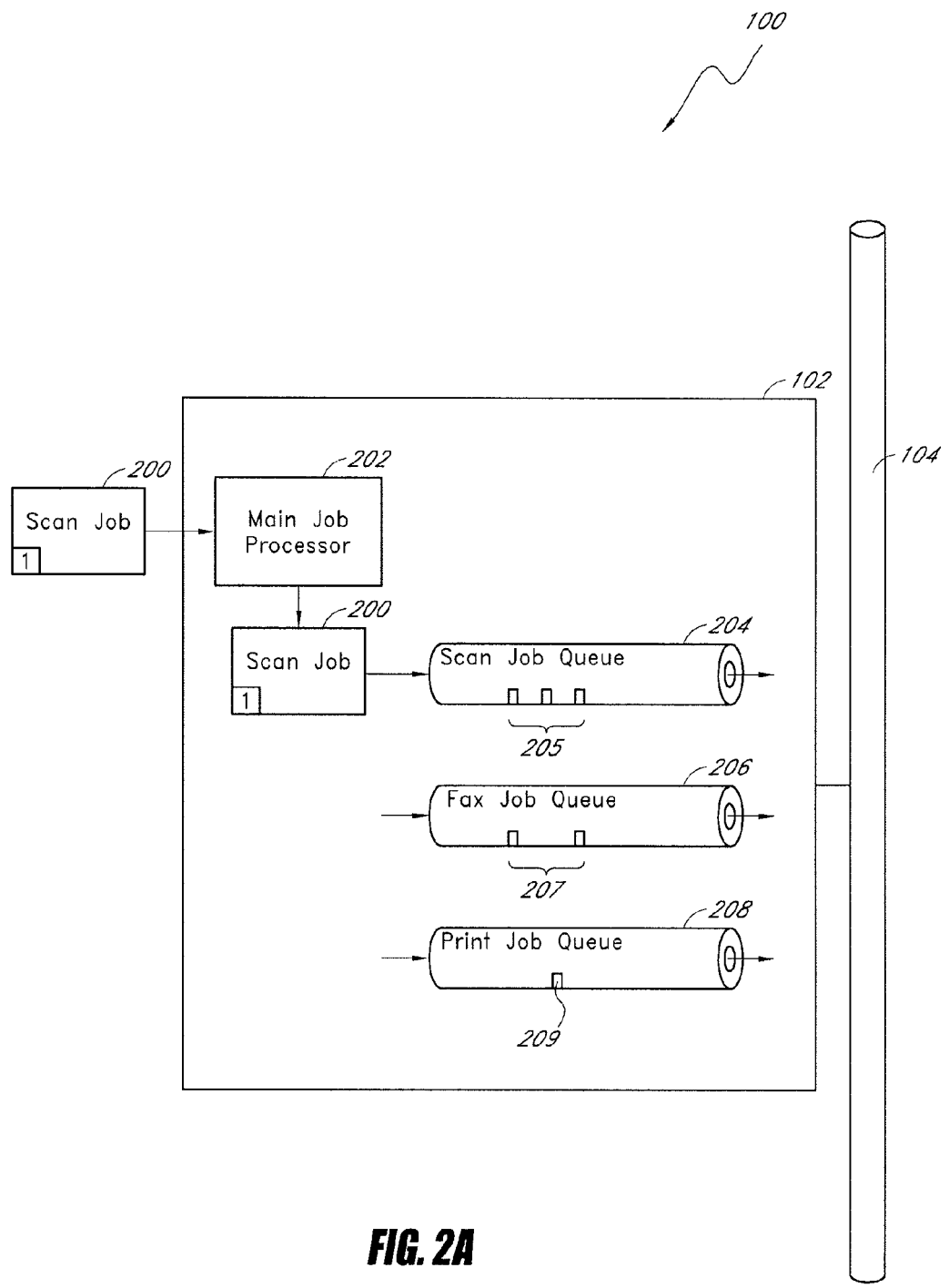

FIGS. 2A and 2B illustrate one embodiment of a multi-function peripheral with embedded load balancing. FIG. 2A illustrates an MFP 102 with embedded load balancing that receives a scan job [1] 200. The MFP 102 with embedded load balancing includes a main job processor 202 for determining whether to reroute a particular job to another available network device. In the illustrated embodiment, MFP 102 also includes several queues corresponding to particular job-type functions: the scan job queue 204 includes four waiting scan jobs 205; the fax job queue 206 includes two waiting fax jobs 207; and the print job queue 208 includes one waiting print job 209. In the illustrated embodiment, the main job processor 202 determines that scan job [1] 200 may be processed by the MFP 102 without exceeding any load balancing thresholds. Therefore, scan job [1] 200 is routed to the scan job queue 204. There is no need, therefore, for MFP 102 to reroute scan job [1] 200 to another available MFP 102 via network 104.

FIG. 2B illustrates an example of a scan job that is rerouted to another available MFP 102. In the embodiment illustrated in FIG. 2B, the scan job queue 204, corresponding to MFP [A] 102, includes ten waiting scan jobs 205. Because the main job processor 202, corresponding to MFP [A] 102, determines that scan job [1] 200 would exceed at least one load balancing threshold, main job processor 202 reroutes the scan job [1] 200 to another available MFP 102. In the illustrated example, scan job [1] 200 is rerouted to MFP [C] 102 via network 104.

One skilled in the art will appreciate that there are many suitable usage thresholds that may be defined for an MFP with embedded load balancing. For example, in some embodiments, an MFP with embedded load balancing may define a usage threshold for the maximum number of waiting jobs. In some embodiments, there may be a maximum number of waiting jobs for the different job types processed by the MFP. For example, there may be a maximum number of scan jobs, a maximum number of print jobs, and so forth. Furthermore, in some embodiments, an MFP with embedded load balancing may define a usage threshold for the maximum total size of waiting jobs. In some embodiments, there may be a maximum total size of waiting jobs for the different job types processed by the MFP. For example, there may be a maximum total size for fax jobs, a maximum total size for copy jobs, and so forth. Additionally, in some embodiments, an MFP with embedded load balancing may define a usage threshold for the maximum size of any job. In some embodiments, there may be a maximum size of any job for the different job types processed by the MFP. For example, there may be a maximum size for a print job, and so forth.

Figure 3:
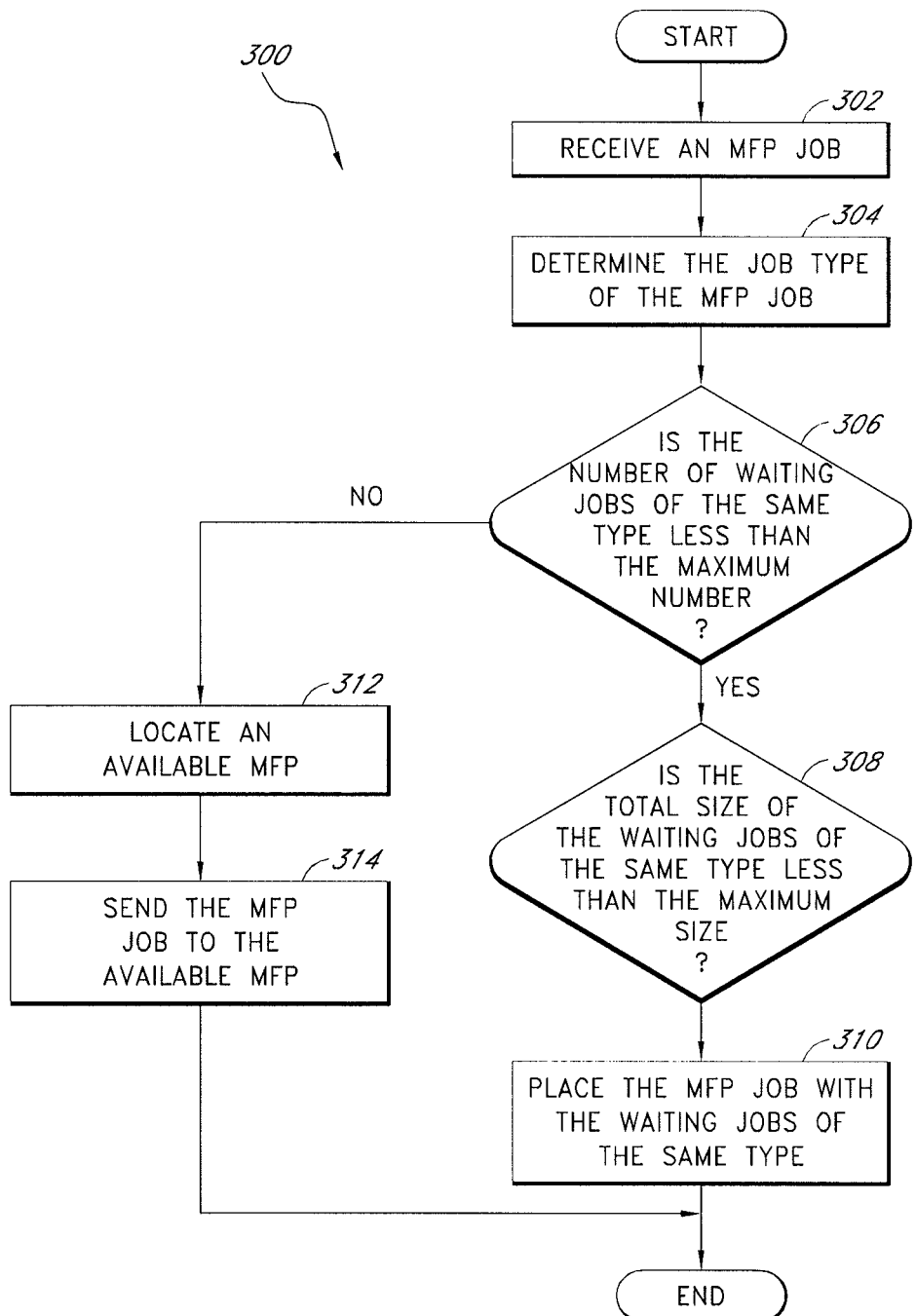
FIG. 3 illustrates a flow chart of one embodiment of redirecting MFP jobs to other available MFPs.

FIG. 3 illustrates a redirecting flowchart 300, illustrating one embodiment of redirecting a complete job to another available network device. In state 302, the main job processor 202 receives an MFP job. In state 304, the main job processor 202 determines the job type of the MFP job. In state 306, if the number of waiting jobs (of the same job type as the MFP job) is less than the maximum number of waiting jobs for the MFP, then the MFP can process the job, and the main job processor proceeds to state 308. If, however, the number of waiting jobs is equal to the maximum number of jobs (of the same job type as the MFP job), then the MFP does not process the MFP job locally, and the main job processor proceeds to state 312. In state 308, if the total size of the waiting jobs of the same job type as the MFP job is less than the maximum permitted size for that job type, then the MFP can process the job, and the main job processor proceeds to state 310. If, however, the total size of the waiting jobs is equal to the maximum total size of the waiting jobs, then the MFP does not process the MFP job locally, and the main job processor proceeds to state 312. As described in greater detail below with respect to FIG. 4, in some embodiments, an MFP job may individually exceed the maximum total size of waiting jobs for a particular job type, such as the printing job type, and may be rerouted regardless of any waiting jobs.

In state 312, the main job processor 202 locates an available similarly capable device, such as another MFP, on the network 104. It will be appreciated by one skilled in the art that there are different suitable ways to locate an available similarly capable device, such as another MFP. For example, the main job processor 202 may, in some embodiments, broadcast an inquiry to the network devices to determine which similarly capable devices are available to process the job. In other embodiments, the main job processor 202 may multicast or unicast an inquiry to other network devices. When broadcasting, multicasting, unicasting, or otherwise communicating an inquiry, proprietary protocols with information specific to load-balancing devices in the network may be employed. The main job processor 202 then proceeds to state 314. In state 314, the main job processor 202 sends the MFP job to the available MFP located in state 312. As described below with respect to FIG. 4, in some embodiments, the main job processor 202 may send only a portion of a job to another similarly capable device (or multiple portions to other similarly capable devices).

In state 310, the main job processor 202 places the MFP job with the waiting jobs of the same type as the MFP job. In some embodiments, the main job processor 202 places the MFP jobs in a queue of waiting jobs of the same job type. MFP jobs may then be processed, for example, on a first in, first out basis.

Figure 4:
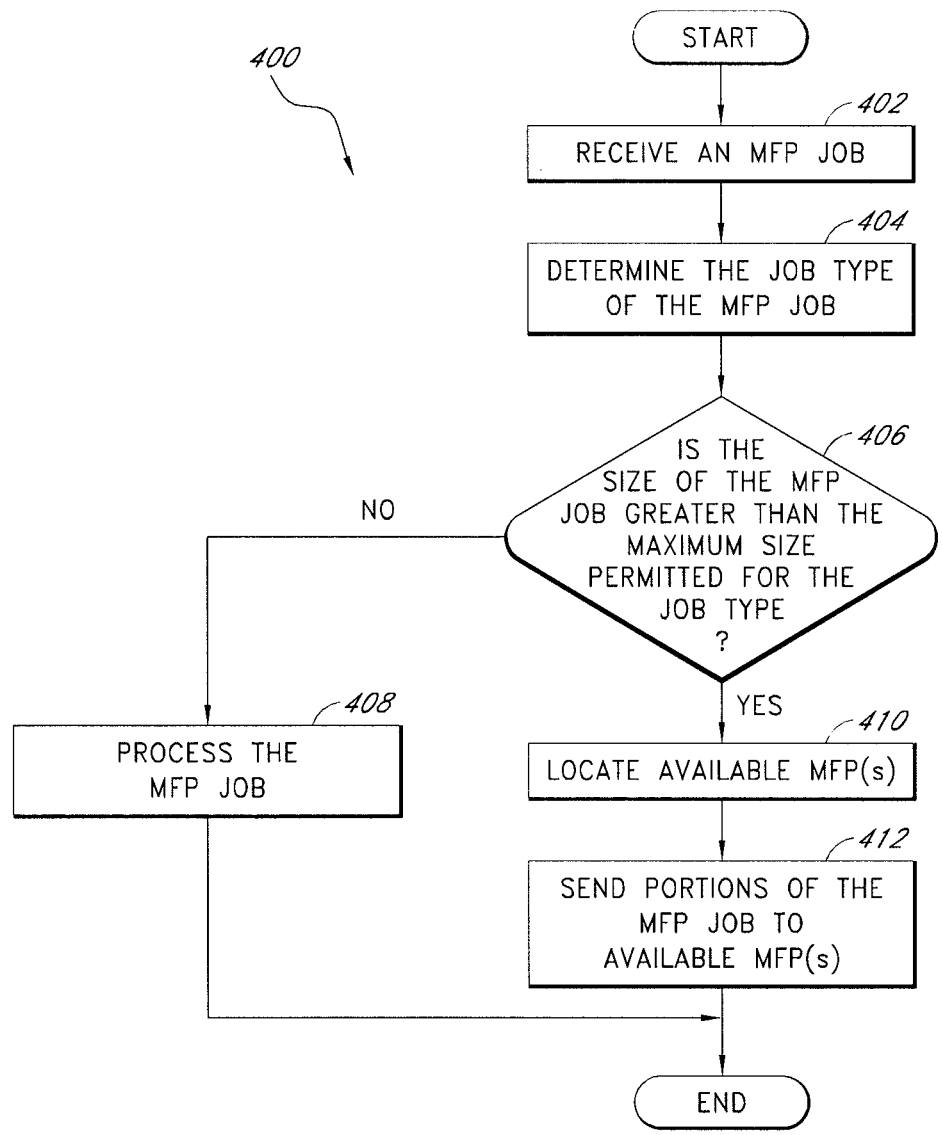
FIG. 4 illustrates a flow chart of one embodiment of ripping a large job and sending parts of it to other available MFPs.

FIG. 4 illustrates a ripping flowchart 400, illustrating one embodiment of ripping a large job. In state 402, the main job processor 202 receives an MFP job. In state 404, the main job processor 202 determines the job type of the MFP job. If the size of the MFP job is greater than the maximum size permitted for the particular job type, as determined in state 406, then the MFP cannot process the job, and the main job processor 202 proceeds to state 410. If, on the other hand, the size of the MFP job is not greater than the maximum size permitted for the job type, as determined in state 406, then the MFP can process the job, and the main job processor 202 proceeds to state 408. In state 408, the main job processor 202 processes the MFP job. In some embodiments, processing the MFP job may include placing the MFP job into a queue of waiting jobs to be processed.

As discussed above, if the size of the MFP job is greater than the maximum size permitted for the job type, then the main job processor 202 proceeds to state 410. In state 410, the main job processor 202 locates available MFP(s). In some embodiments, a main job processor 202 may locate available MFP(s) by broadcasting an inquiry to the network devices and determining which similarly capable devices are available to process the job. The main job processor 202 then proceeds to state 412. In state 412, the main job processor 202 sends portions of the MFP job to available MFP(s).

Figure 5:
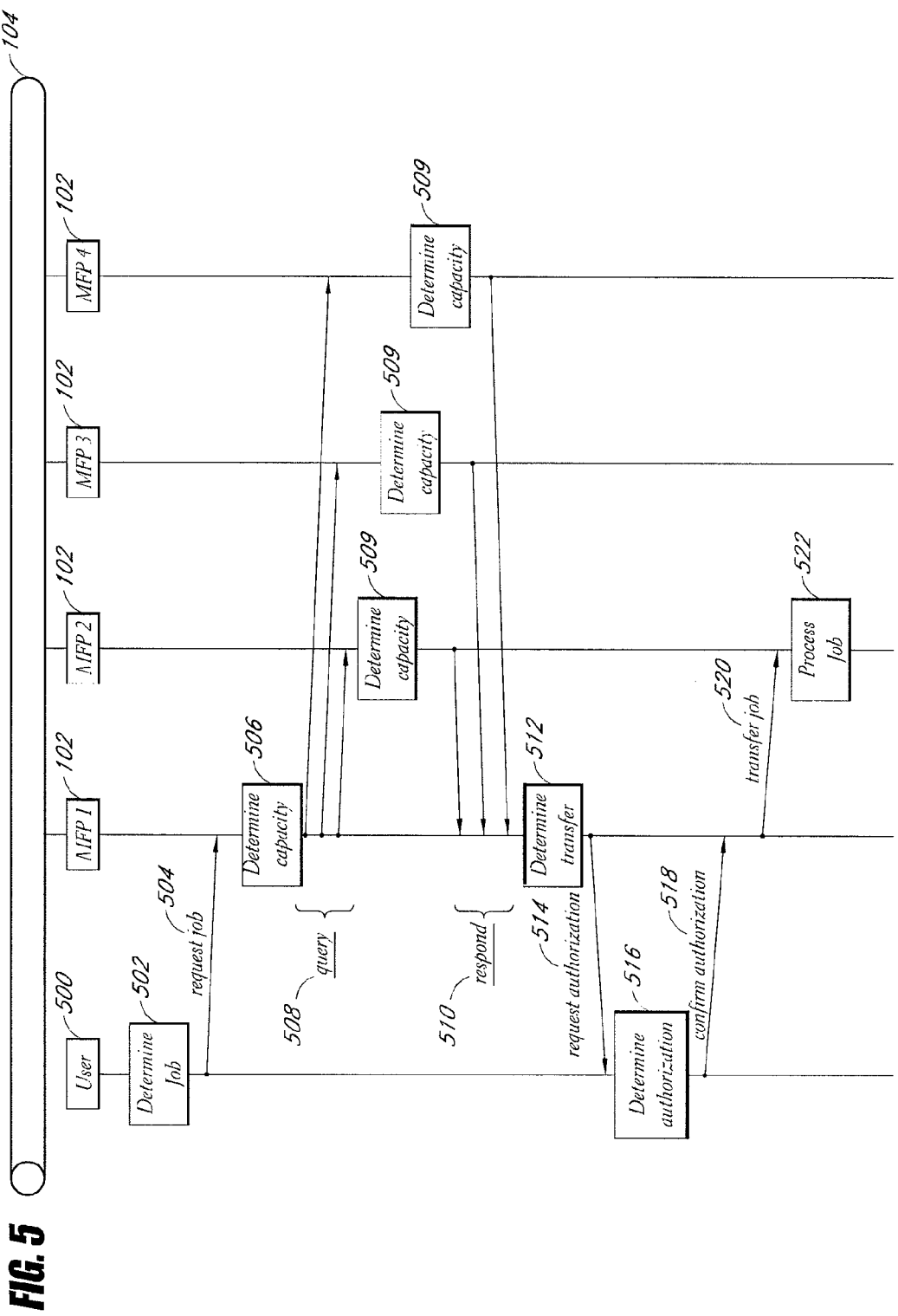
FIG. 5 illustrates a timing chart of one embodiment of a network of multifunction peripherals with embedded load balancing.

FIG. 5 illustrates a timing chart of one embodiment of a network of multifunction peripherals with embedded load balancing. In the illustrated example, a user requests the execution of a single job from an MFP with embedded load balancing. After making a load balancing decision, the MFP decides to transfer the job to another MFP for execution.

In the illustrated embodiment, the networked MFP system 100 includes four MFPs 102: MFP [1] 102, MFP [2] 102, MFP [3] 102, and MFP [4] 102. The MFPs 102 are connected via network 104. User 500 has access to MFP [1] 102. In some embodiments, users may have access to multifunction peripherals with embedded load balancing via a physical device interface. For example, users may access an MFP with embedded load balancing by logging into the MFP at a physical device panel, and then using, for example, the device scanner. Additionally and/or alternatively, users may have access to multifunction peripherals with embedded load balancing via a network interface. For example, users may access an MFP with embedded load balancing by sending a print job to an MFP over a network. In the illustrated embodiment, users may access MFPs 102 either via a physical device interface or via a network interface.

In state 502, user 500 determines a job suitable for executing on an MFP. For example, user 500 may determine to scan a document and send it to a group of recipients via email. User 500 could be a human being or an automated process or machine. In state 504, user 500 requests that MFP [1] 102 execute the determined job. As described above, user 500 may request a job via an MFP's physical device interface or via a network interface. If the determined job is a scan job, then user 500 may request the job via the physical device interface of MFP [1] 102. For example, user 500 may enter login privileges to gain access to MFP [1] 102, and then operate the scanner by positioning a document and executing the scan function.

In state 506, MFP [1] 102 determines its capacity to execute the job. MFP [1] 102 may determine its capacity by evaluating various characteristics of the job, including, but not limited to, the job type of the job and/or a size of the job, and by comparing these characteristics to certain defined thresholds, parameters, or limits, including, but not limited to, the maximum job size for any job, the maximum job size for a particular job type, the maximum cumulative size for all jobs, the maximum cumulative size for all jobs of a particular type, a maximum number of jobs of all job types that can be processed, and/or a maximum number of jobs that can be processed for a particular job type. For example, if the job request directed to MFP [1] 102 is a scan job of 100 MB, and if MFP [1] 102 is already processing five scan jobs with a cumulative size of 450 MB (and seven total jobs with a cumulative size of 750 MB), then MFP [1] 102 may evaluate, for example, the following: whether it is capable of processing scan jobs, whether 100 MB exceeds a maximum size for a scan job (or for any job), whether processing jobs whose cumulative size is 850 MB exceeds a maximum cumulative size for all jobs, whether processing scan jobs whose cumulative size is 550 MB exceeds a maximum cumulative size for all scan jobs, whether processing eight jobs exceeds a maximum number of jobs that can be processed, and whether processing six scan jobs exceeds a maximum number of scan jobs that can be processed. After evaluating its capacity to process the job, MFP [1] 102 may determine that it does not have capacity to process the job. For example, if processing the job would cause MFP [1] 102 to exceed (or approach) a defined limit, maximum, threshold, and so forth—for example, the maximum cumulative size for all jobs—then MFP [1] 102 may determine that it does not have capacity to process the job, and it may then attempt to load balance by transferring the job to another accessible MFP 102. For example, MFP [1] 102 may receive a scan job that is directed to a group of recipients via email addresses. If MFP [1] 102 is already busy sending a previously scanned image to a group of email addresses (or is busy, for example, with other types of jobs that require the same device resources), then MFP [1] 102 may attempt to transfer the job to another MFP, which can accept the scanned image and the list of email addresses, and execute the necessary tasks to send the scanned image to the list of email addresses. One of these steps may include, for example, verifying that the email address is a correct address, establishing an Internet connection, sending the email message via an email protocol.

After determining that it does not have capacity to process the job, MFP [1] 102, in state 508, queries other MFPs accessible via the network. Although in the illustrated embodiment an MFP with embedded load balancing queries other devices after determining that it does not have capacity, in other embodiments this may not be the case. For example, an MFP with embedded load balancing may be configured to always query other accessible devices. Rather than evaluating whether or not it has capacity to process a job, an MFP with embedded load balancing may determine which accessible MFP is most suitable to process the job. An MFP with the lightest load, for example, may be the most suitable. Thus, in some embodiments, MFPs with embedded load balancing may query other MFPs before (or even in place of) determining its own capacity.

In the illustrated embodiment, MFP [1] 102 queries other MFPs by broadcasting its request. In other embodiments, an MFP with embedded load balancing may multicast or unicast queries to other MFPs. When broadcasting, multicasting, or unicasting a request, proprietary protocols with information specific to load-balancing devices in the network may be used. As part of the query, MFP [1] 102 may send MFP [2] 102, MFP [3] 102, and MFP [4] 102 information regarding the requested job, such as the size of the job, the name of the job, user identification, an email list of recipients, a folder list of recipients, a fax number list of recipients, and/or the job type of the job. In state 509, MFP [2] 102, MFP [3] 102, and MFP [4] 102 determine their respective capacity for processing the job. MFP [2] 102, MFP [3] 102, and MFP [4] 102 may determine their capacity in a similar manner in which MFP [1] 102 determines its capacity. Thus, MFP [2] 102, MFP [3] 102, and MFP [4] 102 evaluate various characteristics of the job, including, but not limited to, the job type of the job and/or a size of the job, and by comparing these characteristics to certain defined parameters or limits, including, but not limited to, the maximum job size for any job, the maximum job size for a particular job type, the maximum cumulative size for all jobs, the maximum cumulative size for all jobs of a particular type, a maximum number of jobs of all job types that can be processed, and/or a maximum number of jobs that can be processed for a particular job type.

In state 510, MFP [2] 102, MFP [3] 102, and MFP [4] 102 respond to MFP [1] 102 by transmitting information associated with their respective capacity for processing the job. To respond to MFP [1] 102 with adequate information to allow MFP [1] 102 to determine how to load balance, MFP [2] 102, MFP [3] 102, and MFP [4] 102 may, respectively, transmit at least one of the following to MFP [1] 102: a respective identifier, a location (such as, a network address or some other location), an indicator of its availability to process the job, an indicator of its capability of processing the job based on its job type, and/or an indicator of its capacity (load). For example, MFP [4] 102 may transmit to MFP [1] 102 that it is not available to process the job because it has exceeded its capacity; MFP [3] may transmit to MFP [1] 102 that it is not capable of processing the job type of the job (for example, a scan job); and MFP [2] 102 may transmit to MFP [3] 102 an indicator of its current capacity (for example, a Boolean value and/or a percentage of its capacity based on, for example, the number of jobs it is processing).

Although in the illustrated embodiment the queries and responses are transmitted roughly simultaneously, in other embodiments the queries and responses may be staggered. For example, MFP [1] 102 may query MFP [4] 102 with a unicast message. After determining, for example, that MFP [4] 102 is not available to process the job, MFP [1] 102 may query MFP [2] 102 and MFP [3] 102 simultaneously with a multicast message. One skilled in the art will appreciate the different suitable combinations. In yet other embodiments, MFPs with embedded load balancing may not wait to query in response to a specific job request, but may query, instead, on a continuous (or periodic) basis. It will be appreciated by one skilled in the art that there are many suitable ways to implement a query system that will permit an MFP with embedded load balancing to be apprised of the availability, capability, and capacity of other network devices.

In state 512, MFP [1] 102 determines whether to transfer the job (and, possibly, to which other MFP 102 to transfer the job). In determining whether to transfer the job, MFP [1] 102 may evaluate at least one of the following: a user-specified criterion, an administrator-specified criterion, a system-specified criterion, a user authorization, a location of another (or other) MFP device(s), respective locations of another (or other) MFP device(s) in the network, an indicator that another (or other) MFP device(s) is (are) available to process the job, an indicator that another (or other) MFP device(s) is (are) capable of processing the job based on its job type, an indicator of a capacity of another (or other) MFP device(s), and/or respective capacities on other MFP devices in the network. For example, if MFP [1] 102 receives the responses described above with respect to MFP [4] 102, MFP [3] 102, and MFP [2], then it may determine to transfer the job to MFP [2] 102 because it is the only responding MFP 102 that is capable and available to process the job. If more than one MFP 102 is available and capable of processing the job, the MFP initiating the load balancing may evaluate factors such as device location or overall capacity. Users and administrators may define certain criteria for evaluating priority. MFPs with load balancing may also come configured with certain system default criteria for determining to which MFP to transfer a job. Certain criteria may include, for example, choosing the closest MFP, the least currently full MFP, the historically least utilized MFP, and so forth. It will be appreciated by one skilled in the art that there are other suitable ways for determining how to decide between multiple, capable MFPs.

In some embodiments, such as the illustrated embodiment, an MFP with embedded load balancing may also require user authorization (or administrator authorization) before transferring a job to another MFP. In state 512, MFP [1] 102 requests authorization from the user to transfer the job to MFP [2] 102. The request may be made through the physical interface of the device (for example, an LCD screen with push-button or touch-screen input), or through a network interface (such as a request transmitted over a network that prompts the user for authorization with, for example, a dialogue window requesting "Ok"). It will be appreciated by one skilled in the art that there are many suitable ways for requesting user authorization.

In state 516, user 500 determines whether to authorize the transfer. If user 500 determines to authorize the transfer, then user 500 indicates confirmation of the authorization, in state 518, to MFP [1] 102 by, for example, selecting an "Ok" button. If user 500 decides not to transfer the job, user 500 can override the transfer, requiring MFP [1] 102 to process the job, or if MFP [1] 102 cannot process the job, to abandon the job.

In state 520, MFP [1] 102 transfers the job to MFP [2] 102. In state 522, MFP [2] 202 then processes the job. If the job is a scan job that requires the delivery of a scanned document to a list of recipient email addresses, MFP [2] 102 may execute the necessary tasks to deliver the scanned image by, for example, verifying that the email address is a correct address, establishing an Internet connection, and sending the email message via an email protocol.

As described in greater detail above with reference to FIG. 4, in some embodiments an MFP with load balancing may transfer only a portion of the entire job. Thus, in some embodiments an MFP with embedded load balancing may achieve load balancing by distributing portions of a job to another (or other) MFP device(s). As described in greater detail above with reference to FIG. 2A and FIG. 2B, processing a job (or a portion of a job) may include placing the job in a job-type specific queue of waiting jobs, authenticating a destination for the job, processing user credentials to use the second MFP device, printing the job, and sending the job (or a portion of the job) to at least one of the following destinations: a network folder, an email address, a File Transfer Protocol (FTP) address, a Hypertext Transfer Protocol (HTTP) address, a local device memory, and a fax number.

Although in the illustrated embodiments MFPs with embedded load balancing have transferred jobs to other MFPs with embedded load balancing, in other embodiments different configurations are possible. For example, a network may be comprised of a single MFP with embedded load balancing that transfers jobs without querying or otherwise communicating with other MFPs with embedded load balancing. In other embodiments, load balancing modules may be divided. Thus, some MFPs may be configured to transfer jobs if its capacity is exceeded, but may not accept jobs from other MFPs. In other configurations, some MFPs may be configured to accept jobs from other MFPs (and/or to respond to queries regarding capacity), but may not be configured to query (and transfer jobs to) other MFPs. It will be appreciated by one skilled in the art that there are many suitable ways of dividing the features described herein among different MFPs in a network.

Although this invention has been described in terms of certain embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

What is claimed is:

1. A method of load balancing jobs among multifunction peripheral (MFP) devices, the method comprising:
    receiving a job at a first MFP device;
    determining a job-type specific queue from a plurality of the job-type specific queue for routing the job based on a job type of the job, wherein each instance of the job-type specific queue is associated with a specific job type;
    determining a first MFP device capacity for processing the job in the job-type specific queue;
    querying by the first MFP device for a second MFP device capacity;
    determining at the first MFP device for the second MFP device capacity for processing the job;
    receiving by the first MFP device regarding information associated with the second MFP device capacity for processing the job;
    determining whether to transfer a portion of the job based on considering a number of waiting jobs for the job type meeting or exceeding a maximum number of the waiting jobs at the job-type specific queue and if the number of waiting jobs does not meet or exceed the maximum number of the waiting jobs at the job-type specific queue, determine if a total size of the waiting jobs at the job-type specific queue meeting or exceeding a maximum size for the waiting jobs at the job-type specific queue for load balancing between the first MFP device and a second MFP device; and
    balancing the job for the job type by transferring the portion of the job for processing the portion of the job at the second MFP device based on the number of the waiting jobs for the job type meeting or exceeding the maximum number of the waiting jobs for the job type at the job-type specific queue or based on the total size of the waiting jobs at the job-type specific queue meeting or exceeding the maximum size for the waiting jobs.

2. The method of claim 1, wherein the job corresponds to the job type of one of the following: scan, fax, print, and copy.

3. The method of claim 1, wherein the first MFP device and the second MFP device are configured, respectively, to process at least two of the following: scan jobs, fax jobs, print jobs, and copy jobs.

4. The method of claim 1, wherein receiving the job includes scanning an image via a scanning function of the first MFP device for directing to at least one of the following destinations: a network folder, an email address, a File Transfer Protocol (FTP) address, a Hypertext Transfer Protocol (HTTP) address, a local device memory, and a fax number.

5. The method of claim 1, wherein receiving the job includes receiving a document to be printed via a printing function of the first MFP device from at least one of the following: a fax machine, a local device memory, and another computing device.

6. The method of claim 1, wherein querying for the second MFP device capacity includes communicating a request via at least one of the following:
    broadcasting, multicasting, and unicasting, including via proprietary protocols with information specific to load-balancing devices.

7. The method of claim 1, wherein querying for the second MFP device capacity includes transmitting information associated with the job comprising at least one of the following: a size of the job, a name of the job, a user identification, an email list of recipients, a folder list of recipients, a fax number list of recipients, and the job type of the job.

8. The method of claim 1, wherein determining the first MFP device capacity for processing the job includes comparing at least one of the following: the job type of the job, a size of the job, a maximum job size for any job, the maximum job size for the job type, a maximum cumulative size of all jobs, a maximum cumulative size for all jobs of the job type, the maximum cumulative size for all jobs of the job type, a maximum number of jobs of all job types that can be processed, and a maximum number of jobs that can be processed for the job type.

9. The method of claim 1, wherein receiving the information associated with the second MFP device capacity for processing the job includes receiving at least one of the following: an identifier associated with the second MFP device, a location of the second MFP device, an indicator of whether the second MFP device is available to process the job, an indicator of whether the second MFP device is capable of processing the job based on the job type, and an indicator of a capacity on the second MFP device.

10. The method of claim 1, wherein determining whether to transfer a portion of the job includes evaluating at least one of the following: a user-specified criterion, an administrator-specified criterion, a system-specified criterion, a user authorization, a location of the second MFP device, respective locations of other MFP devices, an indicator that the second MFP device is available to process the job, an indicator that the second MEP device is capable of processing the job based on the job type, an indicator of a capacity on the second MFP device, and respective capacities on other MFP devices.

11. The method of claim 1, wherein the portion of the job is the entire job.

12. The method of claim 1, further comprising processing the portion of the job includes at least one of the following: placing the portion of the job in the job-type specific queue of the waiting jobs, authenticating a destination for the portion of the job, processing user credentials to use the second MFP device, printing the portion of the job, and sending the portion of the job for transmitting to at least one of the following destinations: a network folder, an email address, a File Transfer Protocol (FTP) address, a Hypertext Transfer Protocol (HTTP) address, a local device memory, and a fax number.

13. A multifunction peripheral (MFP) device with an embedded load balancer, the MFP device comprising:
 a scanner is configured to transfer scanned images from the scanner to other MFP devices;
 a load balancing module is configured to balance a load of jobs utilizing the scanner for transferring the jobs to other MFP devices and for:
 receiving a job;
 determining a job-type specific queue from a plurality of the job-type specific queue for routing the job based on a job type of the job, wherein each instances of the job-type specific queue is associated with a specific job type;
 querying a device capacity for processing the job in the job-type specific queue;
 receiving information associated with the device capacity for processing the job;
 determining whether to transfer a portion of the job based on considering a number of waiting jobs for the job type meeting or exceeding a maximum number of the waiting jobs at the job-type specific queue and if the number of waiting jobs does not meet or exceed the maximum number of the waiting jobs at the job-type specific queue, determine if a total size of the waiting jobs at the job-type specific queue meeting or exceeding a maximum size for the waiting jobs at the job-type specific queue for load balancing between the MFP device and an at least one other MFP device; and
 balancing the job for the job type by transferring the portion of the job for processing the portion of the job at the at least one other MFP device based on the number of the waiting jobs for the job type meeting or exceeding the maximum number of the waiting jobs for the job type at the job-type specific queue or based on the total size of the waiting jobs at the job-type specific queue meeting or exceeding the maximum size for the waiting jobs.

14. The MFP of claim 13, wherein receiving the job includes scanning an image, via the scanner, for directing to at least one of the following destinations: a network folder, an email address, a File Transfer Protocol (FTP) address, a Hypertext Transfer Protocol (HTTP) address, and a fax number.

15. The MFP of claim 13, further comprising a printer, wherein receiving the job includes receiving a document to be printed, via the printer, from at least one of the following: a fax machine, a local device memory, and another computing device.

16. The MFP of claim 13, wherein querying for the device capacity includes communicating a request via at least one of the following: broadcasting, multicasting, and unicasting, including via proprietary protocols with information specific to load-balancing devices.

17. The MFP of claim 13, wherein for the device capacity includes comprises transmitting information associated with the job comprising at least one of the following: a size of the job, a name of the job, a user identification, an email list of recipients, a folder list of recipients, a fax number list of recipients, and the job type of the job.

18. The MFP of claim 13, wherein receiving the information associated with the device capacity for processing the job includes receiving at least one of the following: an identifier associated with the at least one other MFP device, a location of the at least one other MFP device, an indicator of whether the at least one other MFP device is available to process the job, an indicator of whether the at least one other MFP device is capable of processing the job based on the job type, and an indicator of a capacity on the at least one other MFP device.

19. The MFP of claim 13, wherein determining whether to transfer the portion of the job includes evaluating at least one of the following: a user-specified criterion, an administrator-specified criterion, a system-specified criterion, a user authorization, a location of the at least one other MFP device, respective locations of the at least one other MFP device, an indicator that the at least one other MFP device is available to process the job, an indicator that the at least one other MEP device is capable of processing the job based on the job type, an indicator of a capacity on the at least one other MFP device, and respective capacities on the at least one other MFP device.

20. The MFP of claim 13, wherein the portion of the job is the entire job.

21. A multifunction peripheral (MFP) device with an embedded load balancer, the MFP device comprising:
 a scanner is configured to transfer scanned images from the scanner to other MFP devices;
 a load balancing module implemented as hardware is configured to balance a load of jobs utilizing the scanner for receiving the jobs from the other MFP devices and for:
 receiving a query for determining a capacity of the MFP to process a job,
 determining a job-type specific queue from a plurality of the job-type specific queue for routing the job based on a job type of the job, wherein each instances of the job-type specific queue is associated with a specific job type, determining the capacity for processing the jobs in the job-type specific queue, receiving information associated with the capacity for processing the job, and balancing the job specific to a job type based on considering a number of waiting jobs for the job type meeting or exceeding a maximum number of the waiting jobs at the job-type specific queue and if the number of waiting jobs does not meet or exceed the maximum number of the waiting jobs at the job-type specific queue, determine if a total size of the waiting jobs at the job-type specific queue meeting or exceeding a maximum size for the waiting jobs at the job-type specific queue for transferring a portion of the jobs to one of the other MFP devices for processing the portion of the jobs.

22. The MFP of claim 21, wherein the query includes information regarding at least one of the following: a size of the job, a name of the job, a user identification, an email list of recipients, a folder list of recipients, a fax number list of recipients, and a job type of the job.

23. The MFP of claim 21, wherein receiving the information associated with the capacity for processing the job includes receiving at least one of the following: an identifier associated with one of the other MFP devices, a location of one of the other MFP devices, an indicator of whether one of the other MFP devices is available to process the job, an indicator of whether one of the other MFP devices is capable of processing the job based on its job type, and an indicator of the load on one of the other MFP devices.

* * * * *